April 16, 1963 L. F. STREET 3,085,288
MATERIAL TREATING APPARATUS
Filed Aug. 15, 1957 2 Sheets-Sheet 1

INVENTOR.
Louis F. Street,
BY
Paul & Paul
ATTORNEYS.

April 16, 1963
L. F. STREET
3,085,288
MATERIAL TREATING APPARATUS
Filed Aug. 15, 1957
2 Sheets-Sheet 2
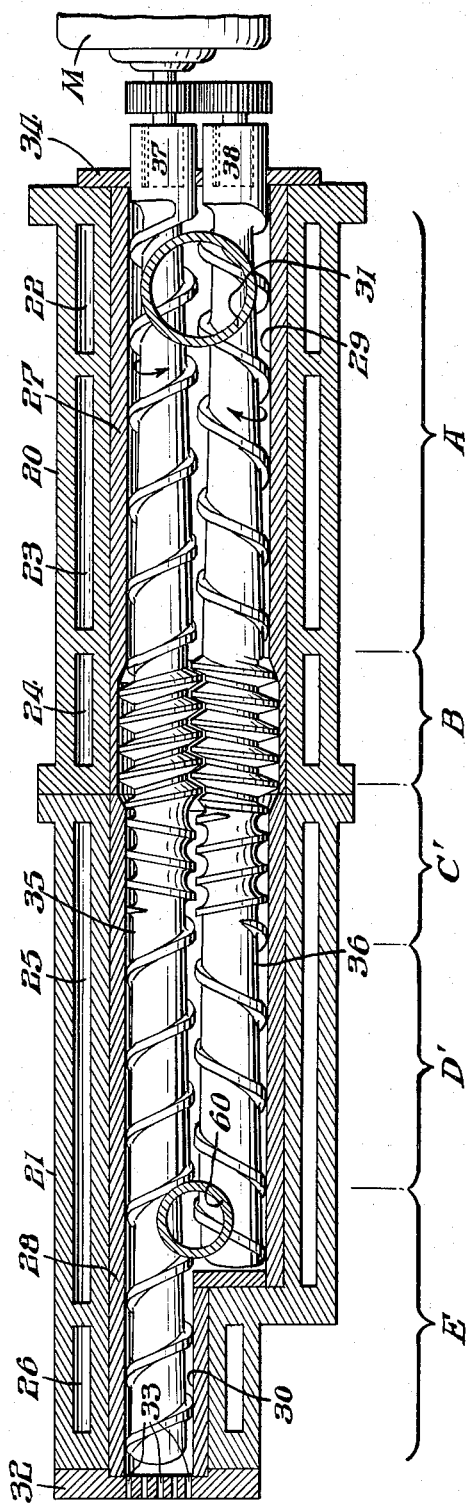
INVENTOR.
Louis F. Street,
BY
Paul & Paul
ATTORNEYS.

3,085,288
MATERIAL TREATING APPARATUS
Louis F. Street, Norristown, Pa., assignor to Welding Engineers, Inc., Norristown, Pa., a corporation of Delaware
Filed Aug. 15, 1957, Ser. No. 678,396
14 Claims. (Cl. 18—12)

This invention relates to an improved system for the treatment of plastic materials. It relates particularly to an improved apparatus for the continuous treatment of plastic materials for their mixing, compounding, reacting and devolatilization, performing one or more such method of treatment in a single continuous operation.

In the construction of continuous worm-type extrusion apparatus having more than one worm or screw, it has been a common practice to so design the machine that the flight of one worm penetrates into the flight space of the adjacent worm, each worm thereby receiving a sealing member in its flight space at this point thus preventing rotation with the worm of the material being treated. The rather positive pumping action thus obtained to forward the material has seemed to many to be the major advantage of this type of multiple worm construction. However, this outstanding advantage of relatively positive pumping has been accompanied by the disadvantage that the mixing and frictional shearing that are often considered advantageous in many other extrusion methods are thereby greatly reduced.

It is an object of this invention to utilize the salient advantages of the positive forwarding obtained by interpenetrating worms, without sacrificing the advantages of mixing and internal shearing obtained on single worm devices or multiple worm devices that do not have interpenetrating worms.

In the past, multiple screw extrusion devices have often been constructed in such a manner that the flights of one screw penetrated into the flight space of an adjacent screw, giving rather close clearance between the parts in such a manner that when the screws rotate a relatively positive pumping action results. Although there are differences in the nature of the action when the screws turn in the same direction compared to turning in the opposite direction it is nevertheless true that in both cases the forwarding action is relatively positive. The advantage of this operation is the high digree in uniformity of rate of output that can be obtained while the disadvantage is the reduced amount of internal shear and mixing of the material.

In multiple screw extruders having the peripheries of their worms tangent, i.e. without intermeshing or interpenetrating of the flights, as shown in the patent to Fuller No. 2,615,199, a high degree of internal shear and mixing can be obtained and this can be controlled to a considerable extent by the design of the processing worms. This device is excellent on many materials but certain materials are difficult to feed forward and, where necessary, to fuse, due to the form of the feed material, its temperature requirements or other reasons, thus limiting the device to a low throughput rate on such materials. Also, the pressure that can be generated by such a device on a given material is limited by its frictional operation which raises the temperature of the material as it raises the pressure and may overheat the material at a point below the desired processing pressure. This creates a limitation not only in ejection pressures forcing material out of the machines through an orifice but also limits the type of mixing operations that can be conducted.

The present invention combines the principal advantages of both systems and in addition broadens the range as to types of materials that can be handled, makes higher throughput rates obtainable, provides new methods of mixing and kneading the material, and presents new advantages in removal of fluids both by pressing out liquids and gases and by vacuum removal in a devolatilizing area.

FIG. 2 represents a modification.

Figure 1:
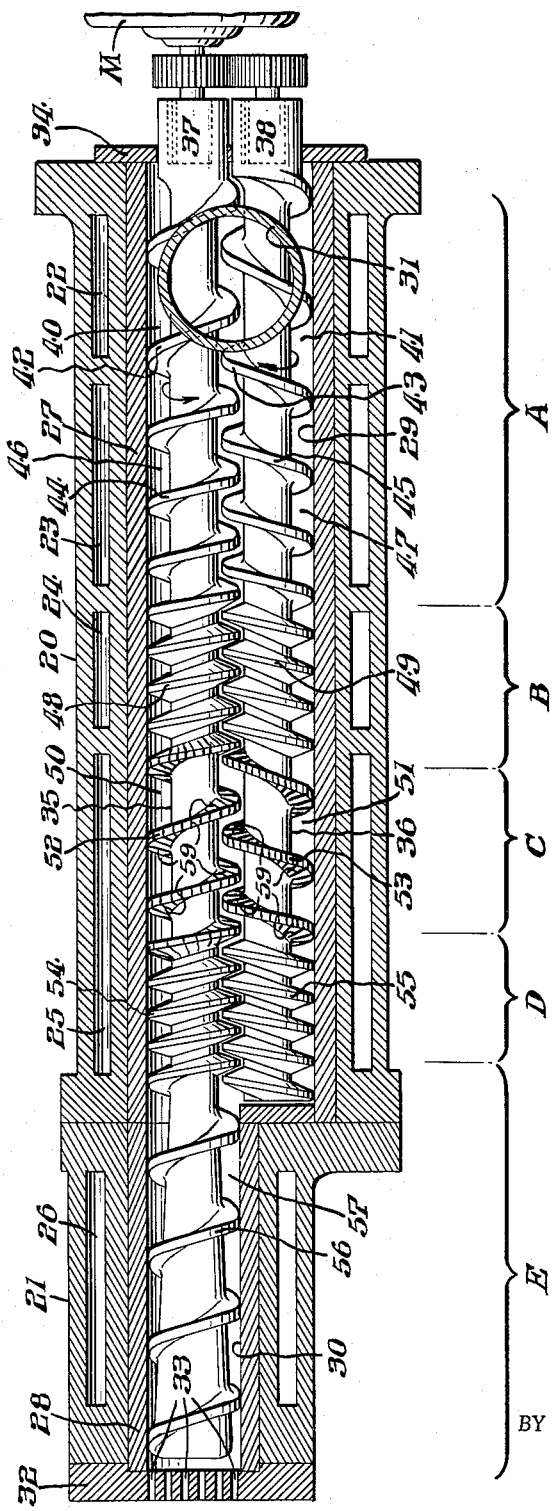
FIG. 1 is a sectional view in plan, illustrating a specific form of apparatus in accordance with this invention.

The following description is directed to the specific forms of the apparatus as shown in the drawings, and is not intended to be addressed to the scope of the invention as exemplified by the drawings. It will be appreciated that the drawings represent preferred embodiments of the invention, which is capable of being practiced in a wide variety of forms and arrangements.

Turning now to the specific form of the invention illustrated in FIG. 1, a casing 20 is provided around the portion of the machine having two worms and another casing 21 around the portion having a single worm, although these casings can be made as one unit if desired. The casing is jacketed at 22, 23, 24, 25 and 26 for the purpose of temperature control by a circulating medium such as hot oil or steam, for example. Other heating means known to those skilled in the art may be substituted. Replacable liners 27, 28 are fixed within the casings 20, 21 to facilitate replacement for wear when the inner bores 29, 30 becomes worn beyond the point of satisfactory operation. A feed opening 31 is located near and above one end of the machine, and a die 32 with orifices 33 is fixed at the discharge end. A material seal 34 is provided to prevent loss through the rear of material being treated.

A main worm 35 and an auxiliary worm 36 are rotatably mounted within the liners 27, 28 and cooperate in treating the plastic material. These worms are rotated through their hubs 37, 38 from a motor M, and are shown turning in opposite directions. It should be realized however, that the basic advantage of this invention is still realized if they turn in the same direction, using a forward feeding helix on each worm, although the treatment of the material is of a somewhat different character than when they turn in opposite directions.

In accordance with this invention, the main and auxiliary worms 35, 36 comprise a plurality of interconnected but radically different sections, each section being displaced from the other sections along the longitudinal axes of the worms, and each section contributing to the overall processing of the plastic material. The section designated by the letter A in FIG. 1 is a non-positive feed section, wherein the plastic material is fed toward the left in a non-positive manner with a provision for a substantial degree of slippage. Section B is a positive feed section, wherein the slippage is very small and the forwarding action is analogous to that of a fluid pump. Section C is a mixing section, of high internal pressure, and this section performs the function of mixing the plastic material while the plastic material is caused to slip both toward the left and toward the right, due to the high internal pressure that is maintained. Section D is a second stage of positive feed, having preferably less forwarding capacity than the first positive feed stage which has been designated as section B. Section E is an extruding section, wherein the processed plastic material is fed toward the die 32.

Referring in further detail to the non-positive feed section A, since the flight spaces 40, 41 are large and the space occupied by the interpenetrating flights is relatively small, any keying effect of the flight to prevent rotation of the material is small. Thus the material can partially rotate with the worms and all the material filling the flight spaces 40, 41 is not compelled to move directly forward. However, as the material moves forward the pitch of the helical flights 44, 45 decreases and the portion of the flight spaces 46, 47 occupied by the interpenetrating flights increases. This brings about a condition where the keying effect of the interpenetrating flight is more and more effective in preventing rotation of the material with the worm and a relatively more positive forward movement of the material results. Flights 48, 49 in section B are constructed so only a slight clearance is present along the mating line at its center to give an almost positive (non-slip) forwarding of the material. The forwarding capacity of these worms is made so it will deliver the proper amount of material for further treatment as well as promote the initial treatment the material undergoes in reaching this area.

In the non-positive feed section A, the flight of the adjacent mating worm fills from 0 up to about 50% of the flight area of the adjacent worm, in a central sectional view. In the positive feed section B, the flight of the adjacent mating worm fills at least 50% and up to about 100% of the flight area of the adjacent worm, in a central sectional view. This percentage varies according to the material being processed and the processing conditions in general, but it is important that the feed end of the non-positive feed section must start with sufficient open flight area such that the percentage figure in the non-positive feed section is much less than that in the positive feed section B. At the start in the non-positive feed section A, the adjacent mating worm must not fill more than 25% of the adjacent worm flight area, at the place where the material is fed into the machine.

The flights 42, 43 at the feed opening and even the flights 44, 45 at an intermediate point tend to advance the material more rapidly than flights 48, 49. Thus one effect of flights 48, 49 is that they act as a resistance to the material being advanced from the feed opening forward. Since the material being advanced from the hopper 31 by the worm flights 42, 43 and 44, 45 is pressing against a resistance, pressure is generated on the material and it is plasticized by the mechanical, frictional heat generated by the worm. This can be aided by temperature control of the jackets. The fact that there is little keying effect from the interpenetrating flights in this portion of the worms permits the material to rotate partially with the worms to obtain the mixing and kneading of the material found to be so desirable in non-positive extruders, that do not have any keying action in the worm flight space.

The worm flights 48, 49 forward the material at a predetermined rate and because of their relatively positive action force it forward even against high pressure. The material being advanced by flights 48, 49 may be fully plasticized or it may be only partially plasticized. As the material enters the flight spaces 50, 51 it tends to be forwarded by the flights 52, 53 and is advanced toward the next advancing flights 54, 55. These flights 54, 55 are closely interpenetrating in a manner similar to flights 48, 49 but have a slightly lower forwarding capacity thus creating a back pressure so that the material in the flight spaces 50, 51 is under pressure due to the difference in forwarding rates of flight 48, 49 and flights 54, 55 and the material is additionally worked and kneaded by the flights 52, 53.

Accordingly, section C provides a pair of co-acting worm sections which compound the plastic—they knead it or mix it and maintain a back pressure on the positive feeding section B. The second stage positive feed section D has less forwarding capacity than the first stage positive feed section B, and this lesser forwarding capacity may be engineered in any desirable manner, such as by providing means for permitting a greater amount of slippage, for example.

In the mixing section C, therefore, material is maintained under high pressure and is flowing forwardly toward the section D and also backwardly toward the section B, but the forward flow exceeds the backward flow. Preferably but not necessarily the flights in mixing section C are provided with a plurality of radially extending slots 59, which are instrumental in assisting the mixing operation.

As the material moves toward the die from flights 54, 55 it is urged forward by the next flight 56 which extrudes it from the die through orifices 33. Any suitable die opening may be used. In some cases, the entire flight space 57 throughout the length of this portion of the worm may be filled and the extrusion pressure is generated cooperatively by flight 56 and flight 54, 55. In other cases the portion of flight space 57 immediately toward the die from flights 54, 55 may not be filled due to low throughput rate or low die resistance and the extrusion out of the die will be accomplished solely by flight 56.

Of course it is obvious to one skilled in the art that the lead of the helix, the root diameter of the worm, the degree of interpenetration and the forwarding capacity of the closely meshed flights can be varied without departing from the scope of the invention. Also flights 52, 53 can be varied by those skilled in the art to give various mixing actions such as by interrupting the continuity of the helix.

The apparatus shown in FIG. 2 of the drawings is in many respects basically similar to that of FIG. 1, and similar numbers are utilized in designating corresponding portions of the apparatus. However, the compounding section C' as shown in FIG. 2 comprises a pair of sections having flights which do not penetrate into the corresponding flight spaces of the adjacent worm, and these are arranged in a reversing position in order to provide a compounding or kneading action on the plastic material.

It will be noted in FIG. 2 that the outer diameters of the flights are not constant, and the liners are accordingly varied in their diameter to correspond with those of the flights.

It will further be appreciated that in FIG. 2, section D' is a milling section and comprises a flight arrangement wherein the flights do not penetrate into the corresponding flight spaces of the adjacent worm. The milling section provides a further mixing of the material and may have a constant depth or a gradually decreasing depth of flight.

In FIG. 2 a vent 60 is shown, such vent being provided for the removal of volatile materials such as solvent components or the like. Vacuum may be applied to the material through the vent 60, if desired. A similar vent may be applied to the device of FIG. 1, if desired.

It will be appreciated that the internal surfaces of the liners are shaped to conform to the shapes of the outer peripheries of the flights of the worms.

Although this invention has been disclosed with reference to specific forms and embodiments thereof, it will be appreciated that a great number of variations may be made without departing from the spirit or scope of this invention. For example, parts may be reversed, equivalent elements may be substituted for those specifically disclosed, and certain features of the invention may be used independently of other features, all without departing from the spirit and scope of this invention as defined in the appended claims.

Having thus described my invention, I claim:

1. Material treating apparatus comprising a pair of substantially parallel elongated worms rotatably arranged in a surrounding casing corresponding in shape to the peripheral shapes of said worms, said worms having flights and intervening flight spaces which are correspondingly arranged, said flights having constant peripheral width and being arranged with said flight spaces in successive sections displaced longitudinally along said worms, one such section being a non-positive forwarding section wherein the flights of each worm are longitudinally spaced from and have substantial clearance with respect to corresponding flights of the other worm, providing in such section a substantially unimpeded slippage between the worm flights and the material, and another section being located to receive the material processed by said non-positive forwarding section and comprising a more positive forwarding section wherein the flights of each of said worms are forwardly inclined and penetrate into the flight spaces of the adjacent worm at the area of closest approach, and wherein such flights are reduced in pitch and have much less clearance with respect to said flight spaces, providing between the worm flights and the material a slippage which is much less than the slippage in said non-positive forwarding section the inlet end of said positive forwarding section being located immediately at the discharge end of said non-positive forwarding section.

2. Material treating apparatus comprising a pair of substantially parallel elongated worms rotatably arranged in a surrounding casing corresponding in shape to the peripheral shapes of said worms, said worms having flights and intervening flight spaces which are correspondingly arranged, said casing substantially confining the material therein to said flight spaces, said flights having a constant peripheral width and being arranged with said flight spaces in successive sections displaced longitudinally along said worms, such sections including a non-positive forwarding section wherein the flights of each worm have a forwardly directed pitch and are free of contact with the corresponding flights of the other worm and fill an area of from zero up to about 50% of the area of the corresponding flight spaces of the other worm, in central sectional view and a more positive forwarding section located to receive the material processed by said non-positive forwarding section, the inlet end of said positive forwarding section being located immediately at the discharge end of said non-positive forwarding section, the flights of said positive forwarding section also having a forwardly directed and reduced pitch and filling a substantial area of from about 50% to about 100% of the area of the corresponding flight spaces, in central sectional view, the feed end of the non-positive feed section having worm flights which fill less flight space area than the area filled by the worm flights in said positive feed section.

3. The apparatus defined in claim 2, wherein at the feed end of the non-positive feed section, the worm flights fill from zero to 25% of the area of the corresponding flight spaces, in central sectional view.

4. Material treating apparatus comprising a pair of substantially parallel elongated worms rotatably arranged in a surrounding casing corresponding in shape to the peripheral shapes of said worms, said casing having a feed end and a discharge end, said worms having flights and intervening flight spaces which are correspondingly arranged, said flights and flight spaces being arranged in successive sections displaced longitudinally along said worms in the direction of movement of said material, such flights including a non-positive forwarding section adjacent said feed end wherein the flights of each worm have a forwardly directed pitch with substantial clearance with respect to the corresponding flight spaces of the other worm, a first positive forwarding section positioned to receive material after it is processed by said non-positive forwarding section wherein such flights also are forwardly inclined and the flights of each worm penetrate into the flight spaces of the other and have much less clearance with respect to said flight spaces than do the flights of said non-positive section, the inlet end of said positive forwarding section being located immediately at the discharge end of said non-positive forwarding section, and another positive forwarding section spaced toward said discharge end and subsequent to an intervening section for giving additional treatment to the material and positioned to receive said material after it is processed by said first positive forwarding section and intervening section and having flights arranged with a forwardly directed pitch with a lesser forwarding capacity than said first positive forwarding section.

5. The apparatus defined in claim 4, wherein the worms of the non-positive forwarding section occupy a space percentage of about zero to 50% of the corresponding worm flight space, while the corresponding space occupying percentage of the flights of each of the positive forwarding sections is greater and is in the range of about 50% to about 100% in central sectional view.

6. Material treating apparatus comprising a pair of substantially parallel elongated worms rotatably arranged in a surrounding casing corresponding in shape to the peripheral shapes of said worms, said casing having a feed and a discharge opening, said worms having flights and intervening flight spaces which are correspondingly arranged, said flights and flight spaces being arranged in successive sections displaced longitudinally along said worms, said casing substantially confining the material therein to said flight spaces, such flights including, in order from said feed to said discharge, a non-positive forwarding section wherein the flights of each worm are forwardly pitched and have substantial clearance between the flights of one worm and the flight spaces of the other worm at the area of closest approach, a first positive forwarding section wherein such flights are forwardly inclined and the flights penetrate into the flight spaces of the other worm and have much less clearance with respect to said flight spaces, such clearance being substantially uniform within said first positive forwarding section, the inlet end of said positive forwarding section being located immediately at the discharge end of said non-positive forwarding section, a mixing section, and a second positive forwarding section having a lesser forwarding capacity than said first positive forwarding section.

7. Material treating apparatus comprising a pair of substantially parallel elongated worms rotatably arranged in a surrounding casing corresponding in shape to the peripheral shapes of said worms, said casing having a feed and a discharge passage, said worms having flights and intervening flight spaces which are correspondingly arranged, said flights and flight spaces being arranged in successive sections displaced longitudinally along said worms, said casing substantially confining the material therein to said flight spaces, such flights including in order from said feed to said discharge, a non-positive forwarding section wherein the flights of each worm have substantial clearance with respect to the corresponding flight spaces of the other worm and fill from zero up to about 50% of said spaces in central sectional view, a positive forwarding section wherein such flights are forwardly inclined and have much less clearance with respect to said flight spaces than do the flights in said non-positive forwarding section, a mixing section, the inlet end of said positive forwarding section being located immediately at the discharge end of said non-positive forwarding section, and a second positive forwarding section having a lesser forwarding capacity than said first positive forwarding section, and an extruding section comprising only one of the two worms and arranged in direct communication with said discharge passage.

8. Material treating apparatus comprising a pair of substantially parallel elongated worms rotatably arranged in a surrounding casing corresponding in shape to the peripheral shapes of said worms, each of said worms having a circular periphery when viewed from either end, said casing having a feed end and a discharge end, said worms having flights and intervening flight spaces which are correspondingly arranged, said flights and flight spaces being arranged in successive sections displaced longitudinally along said worms, such flights including a non-positive forwarding section wherein the flights of each worm are free of contact with the corresponding flights of the other worm and have substantial clearance with respect to the corresponding flight spaces of the other worm and do not penetrate into such flight spaces, a positive forwarding section displaced toward said discharge end relative to said non-positive forwarding section, the flights of said positive forwarding section having much less clearance with respect to said flight spaces and the flights of each worm penetrate into the flight spaces of the other and serving to provide a relatively positive pumping action, and a compounding section displaced toward said discharge end relative to said positive forwarding section, said compounding section having more clearance between corresponding worm flights and worm flight spaces than the clearance in said positive forwarding section, and the worm flights in said compounding section being reversed in pitch with respect to the worm flights in said positive forwarding section.

9. The apparatus defined in claim 8, wherein the positive feed forwarding section has a greater diameter than the compounding section.

10. Material treating apparatus comprising a pair of substantially parallel elongated worms rotatably arranged in a surrounding casing corresponding in shape to the peripheral shapes of said worms, said casing having a feed end and a discharge end, said worms having flights and intervening flight spaces which are correspondingly arranged, said flights and flight spaces being arranged in successive sections displaced longitudinally along said worms, such flights including a non-positive forwarding section wherein the flights of each worm are forwardly pitched and have substantial clearance with respect to the corresponding flight spaces of the other worm, a positive forwarding section wherein such flights are also forwardly inclined and have much less clearance with respect to said flight spaces, the inlet end of said positive forwarding section being located immediately at the discharge end of said non-positive forwarding section, a compounding section having more clearance between worm flight and worm flight spaces than in said positive forwarding section, and a milling section having a greater forwarding capacity than said positive forwarding section.

11. Material treating apparatus comprising a pair of substantially parallel elongated worms rotatably arranged in a surrounding casing corresponding in shape to the peripheral shapes of said worms, heating means incorporated into said casing, drive means for rotating said worms in opposite directions at equal rotary speeds, said worms having flights and intervening flight spaces which are correspondingly arranged, said flights all being forwardly inclined and having constant peripheral width, said flights and flight spaces being arranged in successive sections displaced longitudinally along said worms, such flights including a non-positive forwarding section wherein the flights of each worm have substantial longitudinal and transverse clearance with respect to the corresponding flight spaces of the other worm, and a positive forwarding section wherein such flights are reduced in pitch and have much less clearance with respect to said flight spaces, wherein the worm flights fill no more than 25% of the corresponding flight spaces in the non-positive forwarding section and from 50% to 100% of the corresponding flight spaces in the positive forwarding section the inlet end of said positive forwarding section being located immediately at the discharge end of said non-positive forwarding section.

12. Apparatus for treating plastic material comprising a pair of substantially parallel elongated worms having helical flights of constant peripheral width arranged in successive sections displaced longitudinally along said worms, a casing arranged to surround said worms and formed to correspond at the inner surface thereof with the peripheral shape of said helical flights, said casing having a forward extruding end and a rearward feed end, at least one of said worms extending from said forward end to said rearward end and including a non-positive forwarding feed section at said rearward end wherein the flights of said worm have substantial pitch and relatively wide intervening flight spaces therebetween whereby materials are forwarded to the next forward section in frictional contact with said casing, and a positive forwarding pumping section wherein the flights of said worm are forwardly inclined and are greatly reduced in pitch and penetrate the intervening flight spaces of said parallel worm, the inlet end of said positive forwarding section being located immediately at the discharge end of said non-positive forwarding section, the flights of both said worms in said positive forwarding section having relatively small axial clearance whereby said material is pumped forward in said apparatus at a uniform rate of flow.

13. The apparatus defined in claim 1, wherein the free flight volume for each full turn of each worm in said non-positive forwarding section is greater than the corresponding free flight volume in said positive forwarding section.

14. The apparatus defined in claim 13, wherein the ratio of the free flight volume in said non-positive forwarding section to the corresponding free flight volume in said positive forwarding section is within the range of about 1½:1 to about 6:1.

References Cited in the file of this patent

UNITED STATES PATENTS

| Re. 23,948 | Fuller | Feb. 15, 1955 |
| 2,119,162 | Hartner | May 31, 1938 |
| 2,434,707 | Marshall | Jan. 20, 1948 |
| 2,508,495 | Consalvo | May 23, 1950 |
| 2,543,894 | Colombo | Mar. 6, 1951 |
| 2,674,104 | Street | Apr. 6, 1954 |
| 2,733,051 | Street | Jan. 31, 1956 |

FOREIGN PATENTS

| 156,508 | Australia | May 17, 1954 |